(12) United States Patent
Hamami

(10) Patent No.: US 6,898,188 B1
(45) Date of Patent: May 24, 2005

(54) GATEKEEPER SIMULATOR IN A LAN TELEPHONY SYSTEM

(75) Inventor: Ilan Hamami, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 840 days.

(21) Appl. No.: 09/838,522

(22) Filed: Apr. 19, 2001

(51) Int. Cl.[7] .................................................. H04J 1/16
(52) U.S. Cl. ...................... 370/252; 370/352; 379/88.17
(58) Field of Search ................................. 370/252, 389, 370/352–356, 400, 401; 379/88.17, 230; 709/224

(56) References Cited

U.S. PATENT DOCUMENTS

| | | | |
|---|---|---|---|
| 6,229,804 B1 | 5/2001 | Mortsolf et al. | 370/352 |
| 6,487,196 B1 * | 11/2002 | Verthein et al. | 370/352 |
| 6,636,508 B1 * | 10/2003 | Li et al. | 370/389 |

\* cited by examiner

Primary Examiner—John Pezzlo
Assistant Examiner—Hassan Kizou
(74) Attorney, Agent, or Firm—Howard Zaretsky

(57) ABSTRACT

An apparatus for and a method of simulating the functionality of the gatekeeper in a LAN telephony system. The gatekeeper simulator of the present invention enables tester personnel to manually control the behavior of the gatekeeper and its environment. The gatekeeper simulation platform utilizes a commonly available computing platform such as a personal computer (PC) adapted so as to have a LAN connection interface such as a commonly available Network Interface Card (NIC), IP communication stack and an H.323 protocol stack. A gatekeeper simulation software application runs over the IP communication stack and H.323 protocol stack which together constitute a LAN telephony platform. The gatekeeper simulator is adapted to simulate any desired request supported by the H.323 protocol suite. In addition, it is adapted to simulate all possible responses to a request as well. Further, it is adapted to simulate the responses selectively and individually for each specific user in the network. In addition, the simulator comprises a preprogrammed address translation table (i.e. IP phone table) that can be configured and programmed by a user to contain the same information it would have contained as a result of IP phones having been registered.

21 Claims, 5 Drawing Sheets

GATEKEEPER SIMULATOR IN A LAN TELEPHONY SYSTEM

FIELD OF THE INVENTION

The present invention relates generally to voice over IP networks and more particularly relates to an apparatus and method for simulating the function of a gatekeeper simulator in a LAN telephony environment.

BACKGROUND OF THE INVENTION

Separate Voice and Data Networks

Currently, there is a growing trend to converge voice and data networks so that both utilize the same network infrastructure. The currently available systems that combine voice and data have limited applications and scope. An example is Automatic Call Distribution (ACD), which permits service agents in call centers to access customer files in conjunction with incoming telephone calls. ACD centers, however, remain costly and difficult to deploy, requiring custom systems integration in most cases. Another example is the voice logging/auditing system used by emergency call centers (e.g., 911) and financial institutions. Deployment has been limited due to the limited scalability of the system since voice is on one network and data is on another, both tied together by awkward database linkages.

The aim of IP telephony is to provision voice over IP based networks in both the local area network (LAN) and the wide area network (WAN). Currently, voice and data generally flow over separate networks, the goal is to transmit both of them over a single medium and on a single network.

A block diagram illustrating example separate prior art data and voice networks is shown in FIG. 1. The LAN portion, generally referenced 10, comprises the LAN cabling infrastructure, routers, switches and gateways 12 and one or more network devices connected to the LAN. Examples of typical network devices include servers 14, workstations 16 and printers. The voice portion, generally referenced 20, has at its core a private branch exchange (PBX) 24 which comprises one or more trunk line interfaces and one or more telephone and/or facsimile extension interfaces. The PBX is connected to the public switched telephone network (PSTN) 22 via one or more trunk lines 28, e.g., analog, T1, E1, T3, ISDN, etc. A plurality of user telephones 26 and one or more facsimile machines 27 are also connected directly to the PBX via phone line extensions 29.

The paradigm currently in wide spread use consists of circuit switched fabric 20 for voice networks and a completely separate LAN infrastructure 10 for data. Most enterprises today use proprietary PBX equipment for voice traffic.

Voice and Data Over a Shared Network

An increasingly common IP telephony paradigm consists of telephone and data tightly coupled on IP packet based, switched, multimedia networks where voice and data share a common transport mechanism. It is expected that this paradigm will spur the development of a wealth of new applications that take advantage of the simultaneous delivery of voice and data over a single unified fabric.

A block diagram illustrating a voice over an IP network where voice and data share a common infrastructure is shown in FIG. 2. The IP telephony system, generally referenced 30, comprises, a LAN infrastructure represented by an Ethernet switch 32, a router, one or more telephones 36, workstations 34, a gateway 42, a gatekeeper 46, a PBX 33 with a LAN interface port and a Layer 3 switch 38. The key components of an IP telephony system 30 are the modified desktop, gatekeeper and gateway entities. For the desktop, users may have an Ethernet phone 36 that plugs into an Ethernet RJ-45 jack or a handset or headset 35 that plugs into a PC 37.

Today, all LAN based telephony systems need to connect to the PSTN 44. The gateway is the entity that is specifically designed to convert voice from the IP domain to the PSTN domain. The gatekeeper is primarily the IP telephony equivalent of the PBX in the PSTN world.

Typically, the IP telephony traffic is supported by a packet-based infrastructure such as an Ethernet network but a circuit-based infrastructure can be used as well with some provisions (e.g., ATM LAN emulation on ATM networks). Telephony calls traversing the intranet may pass through a Layer 3 switch 38 or a router (not shown) connecting a corporate intranet 40. The Layer 3 switch and the router should support Quality of Service (QoS) features such as IEEE 802.1p and 802.1Q and Resource Reservation Protocol (RSVP).

ITU-T Recommendation H.323

The International Telecommunications Union (ITU-T) Telecommunications Standardization Sector has issued a number of standards related to telecommunications. The Series H standards deals with audiovisual and multimedia systems and describes standards for systems and terminal equipment for audiovisual services. The H.323 standard is an umbrella standard that covers various audio and video encoding standards. Related standards include H.225.0 that covers media stream packetization and call signaling protocols and H.245 that covers audio and video capability exchange, management of logical channels and transport of control and indication signals. Details describing these standards can be found in ITU-T Recommendation H.323 (Draft 4 Aug. 1999), ITU-T Recommendation H.225.0 (February 1998) and ITU-T Recommendation H.245 (Jun. 3, 1999).

A block diagram illustrating example prior art H.323 compliant terminal equipment is shown in FIG. 3. The H.323 terminal 50 comprises a video codec 52, audio codec 54, system control 56 and H.225.0 layer 64. The system control comprises H.245 control 58, call control 60 and Registration, Admission and Status (RAS) control 62.

Attached video equipment 66 includes any type of video equipment, such as cameras and monitors including their control and selection, and various video processing equipment. Attached audio equipment 70 includes devices such as those providing voice activation sensing, microphones, loudspeakers, telephone instruments and microphone mixers. Data applications and associated user interfaces 72 such as those that use the T.120 real-time audiographics conferencing standard or other data services over the data channel. The attached system control and user interface 74 provides the human user interface for system control. The network interface 68 provides the interface to the IP based network.

The video codec 52 functions to encode video signals from the video source (e.g., video camera) for transmission over the network and to decode the received video data for output to a video display. If a terminal incorporates video communications, it must be capable of encoding and decoding video information in accordance with H.261. A terminal may also optionally support encoding and decoding video in accordance with other recommendations such as H.263.

The audio codec 54 functions to encode audio signals from the audio source (e.g., microphone) for transmission over the network and to decode the received audio data for output to a loudspeaker. All H.323 audio terminals must be capable of encoding and decoding speech in accordance with G.711 including both A-law and μ-law encoding. Other types of audio that may be supported include G.722, G.723, G.728 and G.729.

The data channel supports telematic application such as electronic whiteboards, still image transfer, file exchange, database access, real-time audiographics conferencing (T. 120), etc. The system control unit 56 provides services as defined in the H.245 and H.225.0 standards. For example, the system control unit provides signaling for proper operation of the H.323 terminal, call control, capability exchange, signaling of commands and indications and messaging to describe the content of logical channels. The H.225.0 Layer 64 is operative to format the transmitted video, audio, data and control streams into messages for output to the network interface. It also functions to retrieve the received video, audio, data and control steams from messages received from the network interface 68.

The gateway functions to convert voice from the IP domain to the PSTN domain. In particular, it converts IP packetized voice to a format that can be accepted by the PSTN. The actual format depends of the type of media and protocol used for connecting to the PSTN (e.g., T1, E1, ISDN BRI, ISDN PRI, analog lines, etc.). The gateway provides the appropriate translation between different video, audio and data transmission formats and between different communications procedures and medias.

Note that since the digitization format for voice on the IP packet network is often different than on the PSTN, the gateway needs to provide a form of conversion known as transcoding. Note also that gateways also function to pass signaling information such as dial tone, busy tone, etc. Typical connections supported by the gateway include analog, T1, E1, ISDN, frame relay and ATM at OC-3 and higher rates. Additional functions performed by the gateway include call setup and clearing on both the network side and the PSTN side. The gateway may be omitted if communications with the PSTN is not required.

The gatekeeper functions to provide call control services, address translation services, call routing services, call authorization services, billing, bandwidth management and telephony supplementary services like call forwarding and call transfer to terminal endpoints on the network. It is primarily designed to be the IP telephony equivalent of the PBX. Logical endpoints register themselves with the gatekeeper before attempting to bring up a session. The gatekeeper may deny a request to bring up a session or may grant the request at a reduced data rate. This is particularly relevant to video connections that typically consume huge amounts of bandwidth for a high quality connection.

Call control signaling is optional as the gatekeeper may choose to complete the call signaling with the H.323 endpoints and process the call signaling or it may direct the endpoints to connect the call signaling channel directly to each other, thus the gatekeeper avoids handling the H.225.0 call control signals.

Through the use of H.225.0 signaling, the gatekeeper may reject calls from a terminal due to authorization failure. The reasons for rejection may include restricted access to or from particular terminals or gateways, or restricted access during certain time periods.

Bandwidth management entails controlling the number of H.323 terminals that are allowed to simultaneously access the network. Via H.225.0 signaling, the gatekeeper may reject calls from a terminal due to bandwidth limitations. This may occur if the gatekeeper determined that there is not sufficient bandwidth available on the network to support the call.

The call management function performed by the gatekeeper includes maintaining a list of currently active H.323 calls. This information is used to indicate that a terminal is busy and to provide information for the bandwidth management function.

The gatekeeper also provides address translation whereby an alias address is translated to a Transport Address. This is performed using a translation table that is updated using Registration messages, for example.

Real-Time Transport Protocol

The H.225.0 standard dictates the usage of the Real-Time Transport Protocol (RTP) which is defined by the IETF in RFC 1889 for conveying the data between the call endpoints and for monitoring the network congestion. The RTP protocol defines the RTP packet structure that includes two parts: the RTP packet header part and the RTP packet payload part. The RTP packet header includes several fields. Among those fields, are the payload type identification field, the sequence numbering field and the time stamping field. Typically, applications encapsulate RTP in a UDP packet. UDP/IP is an unreliable transport mechanism and therefore there is no guarantee that the RTP packet would reach its destination. RTP may, however, be used with other suitable underlying network or transport protocols.

RTP does not itself provide any mechanism to ensure timely delivery or other QoS guarantees, but relies on lower layer services to do so. It also does not guarantee delivery, nor does it assume that the underlying network is reliable and delivers packets in sequence. RTP includes sequence numbers and timestamps in the packet to allow the receiver to reconstruct the sender's packet sequence and timing.

RTP is intended to be flexible so as to provide the information required by a particular application. Unlike conventional protocols in which additional functions may be accommodated by making the protocol more general or by adding an option mechanism that requires parsing, RTP can be tailored through modifications and/or additions to the headers.

The RTP Control Protocol (RTCP) functions to periodically transmit control packets to all participants in a session. The primary function of RTCP is to provide feedback on the quality of the data distribution that is useful for monitoring network congestion. The RTCP protocol is designed to monitor the quality of service and to convey information about the participants in an on-going session. RTCP also carries a transport level identifier for an RTP source called the canonical name or CNAME. Receivers require the CNAME to associate multiple data streams from a given participant in a set of related RTCP sessions. The RTCP protocol can also be used to convey session control information such as participant identification. Each RTCP packet begins with a fixed header followed by structured elements of variable length. Note that the signaling/control information carried in the RTCP packets is transmitted using TCP/IP reliable protocol.

Also under the H.323 protocol umbrella are a number of standards for voice codecs including for example, G.711, G.729, G.729.1 and G.723.1.

Call Signaling

Call signaling encompasses the messages and procedures used to establish a call, request changes in bandwidth of the call, get status of the endpoints in the call and disconnect the call. Call signaling uses messages defined in the H.225.0 standard. In particular, the RAS signaling function uses H.225.0 messages to perform registration, admissions, bandwidth changes, status and disengage procedures between endpoints and Gatekeepers. The RAS Signaling Channel is independent from the Call Signaling Channel and the H.245 Control Channel.

Each H.323 entity has at least one network address that uniquely identifies the H.323 entity on the network. For each network address, each H.323 entity may have several TSAP identifiers that enable the multiplexing of several channels sharing the same network address. Endpoints have one well-known TSAP identifier known as the Call Signaling Channel TSAP Identifier. In addition, Gatekeepers also have one well-known TSAP identifier defined known as the RAS Channel TSAP Identifier, and one well-known multicast address defined known as the Discovery Multicast Address. Endpoints and H.323 entities use dynamic TSAP Identifiers for the H.245 Control Channel, Audio Channels, Video Channels, and Data Channels while the Gatekeeper uses a dynamic TSAP Identifier for Call Signaling Channels.

Further, an endpoint may have one or more alias addresses associated with it. An alias address represents the endpoint and provides an alternate method of addressing the endpoint. It is important to note that an endpoint may have more than one alias address that translates to the same TSAP. The alias may comprise, for example, private telephone numbers, E.164 numbers, any alphanumeric string that may represent a name, e-mail address, etc. In addition, the alias may comprise a MAC address, IP address, ATM address, access token, DNS address, TSAP as IP address concatenated with port number or name alias. Note that alias addresses are unique within a zone and that gatekeepers do not have alias addresses.

When there is a Gatekeeper in the network, the calling endpoint addresses the called endpoint by its Call Signaling Channel Transport Address or by its alias address. The Gatekeeper translates the latter into a Call Signaling Channel Transport Address.

An endpoint joins a zone via the registration process whereby it informs the Gatekeeper of its Transport Addresses and one or more associated alias addresses. Note that registration must take place before any calls are attempted. When endpoints are powered up, they look on the network for the Gatekeeper and once found, they register their TSAP and one or more aliases associated therewith.

Simulation Tools

It is common when developing LAN telephony systems or other networks and systems having a large number of entities that interact with each other, to use one or more simulation tools to simulate the environment and the behavior of the entities being developed. The simulator typically is able to simulate most types of scenarios so as to permit the testing of the interoperable behavior of the entities of the product under real world conditions and to effect the correction of any problems discovered. The scenarios that are desirable to simulate are typically very difficult and almost impossible to create using real equipment, since real equipment typically cannot be controlled to simulate specific scenarios.

Another use for simulation tools for simulating equipment is for testing purposes by an external interoperability laboratory. The external laboratory tests vendor equipment under various scenarios and provides reports about the quality of the products under test.

It is therefore desirable to have a simulation tool for use in a LAN telephony system that is able to simulate the functionality of the gatekeeper since it is the central entity of a LAN telephony system.

SUMMARY OF THE INVENTION

The present invention provides an apparatus for and a method of simulating the functionality of the gatekeeper in a LAN telephony system. In LAN telephony systems being developed today and most likely in convergent systems developed in the future, the gatekeeper is the central entity. Therefore, the gatekeeper is simulated in order that the behavior of the gatekeeper and all entities attached to it or that communicate with it are fully tested under all possible scenarios. The gatekeeper simulator of the present invention enables tester personnel to manually control the behavior of the gatekeeper and its environment. The gatekeeper simulation platform of the present invention utilizes a commonly available computing platform such as a personal computer (PC) adapted so as to have a LAN connection interface such as a commonly available Network Interface Card (NIC), IP communication stack and an H.323 protocol stack. In addition, the gatekeeper simulation platform comprises a software application that simulates the functionality of the gatekeeper. The gatekeeper simulation software application runs over the IP communication stack and H. 323 protocol stack which together constitute a LAN telephony platform.

The gatekeeper simulator is adapted to simulate any desired request supported by the H.323 protocol suite. In addition, it is adapted to simulate all possible responses to a request as well. Further, it is adapted to simulate the responses selectively and individually for each specific users in the network. In addition, the simulator comprises a pre-programmed address translation table (i.e. IP phone table) that can be configured and programmed by a user to contain the same information it would have contained as a result of IP phones having been registered.

There is therefore provided in accordance with the present invention an apparatus for simulating the functionality of a gatekeeper entity in a Local Area Network (LAN) telephony system comprising a LAN telephony platform adapted to provide lower layer communications including an interface to the LAN telephony network, an IP communications stack and an H.323 protocol stack, an event processor adapted to process event messages received from and transmitted to the LAN telephony network, an IP phone table comprising an event table portion and an action table portion, the event table adapted to generate a response ID in response to one or more fields in the received event messages, a response script table comprising a plurality of responses to events, the response script table operative to generate a response in accordance with the response ID and to forward the response to the event processor for transmission to the LAN telephony network, an action scanner adapted to loop through the contents of the action table such that for each valid action within the action table, an action ID is generated, an action script table comprising a plurality of actions to be performed, the action script table operative to generate an action in accordance with the action ID and to forward the action to the event processor for subsequent processing and a user interface for permitting a user to preprogram the contents of the event table, the action table, the response script table and the action script table and to configure the action scanner.

There is also provided in accordance with the present invention a method for simulating a gatekeeper in a Local Area Network (LAN) telephony network, the method comprising the steps of providing a LAN telephony platform adapted to provide lower layer communications including an interface to the LAN telephony network, an IP communications stack and an H.323 protocol stack, processing event messages received from and transmitted to the LAN telephony network including looking up a response ID corresponding thereto utilizing an event table; and upon occurrence of a hit, retrieving a specific response from a response script table, using the corresponding response ID, and subsequently transmitting the response onto the LAN network, cycling through a plurality of action ID pointers stored in an action table, each action pointer associated with an action to be performed and retrieving a specific action from an action script table, using the corresponding action pointer, and performing each action corresponding therewith.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
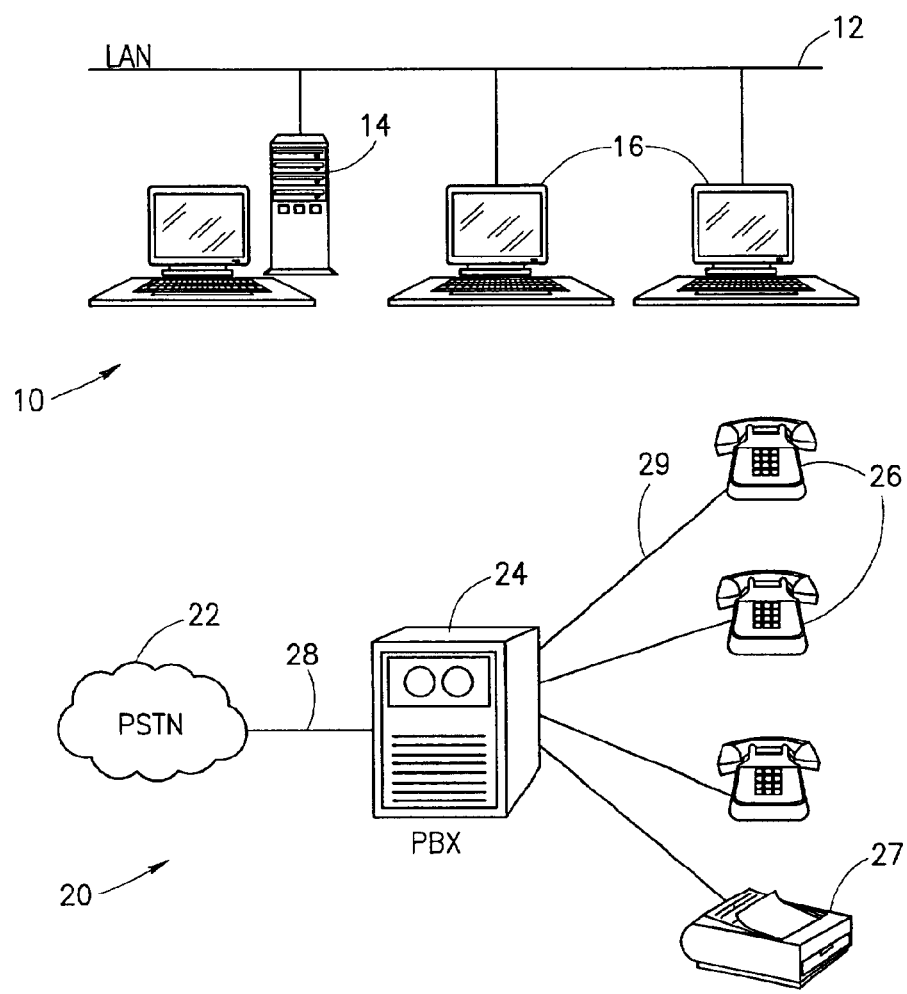
FIG. 1 is a block diagram illustrating example separate prior art data and voice networks.
Figure 2:
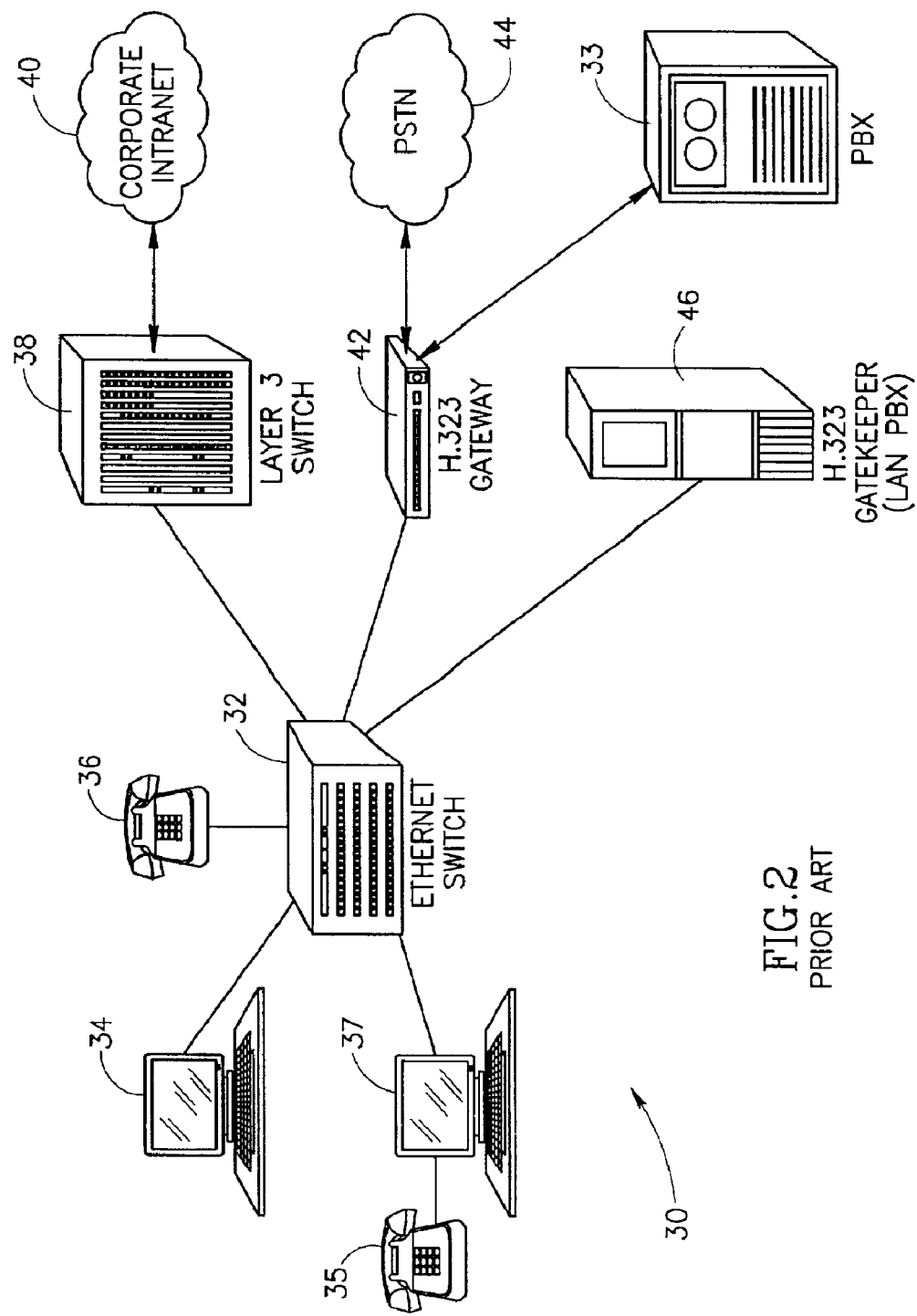
FIG. 2 is a block diagram illustrating a voice over packet network where voice and data share a common infrastructure.
Figure 3:
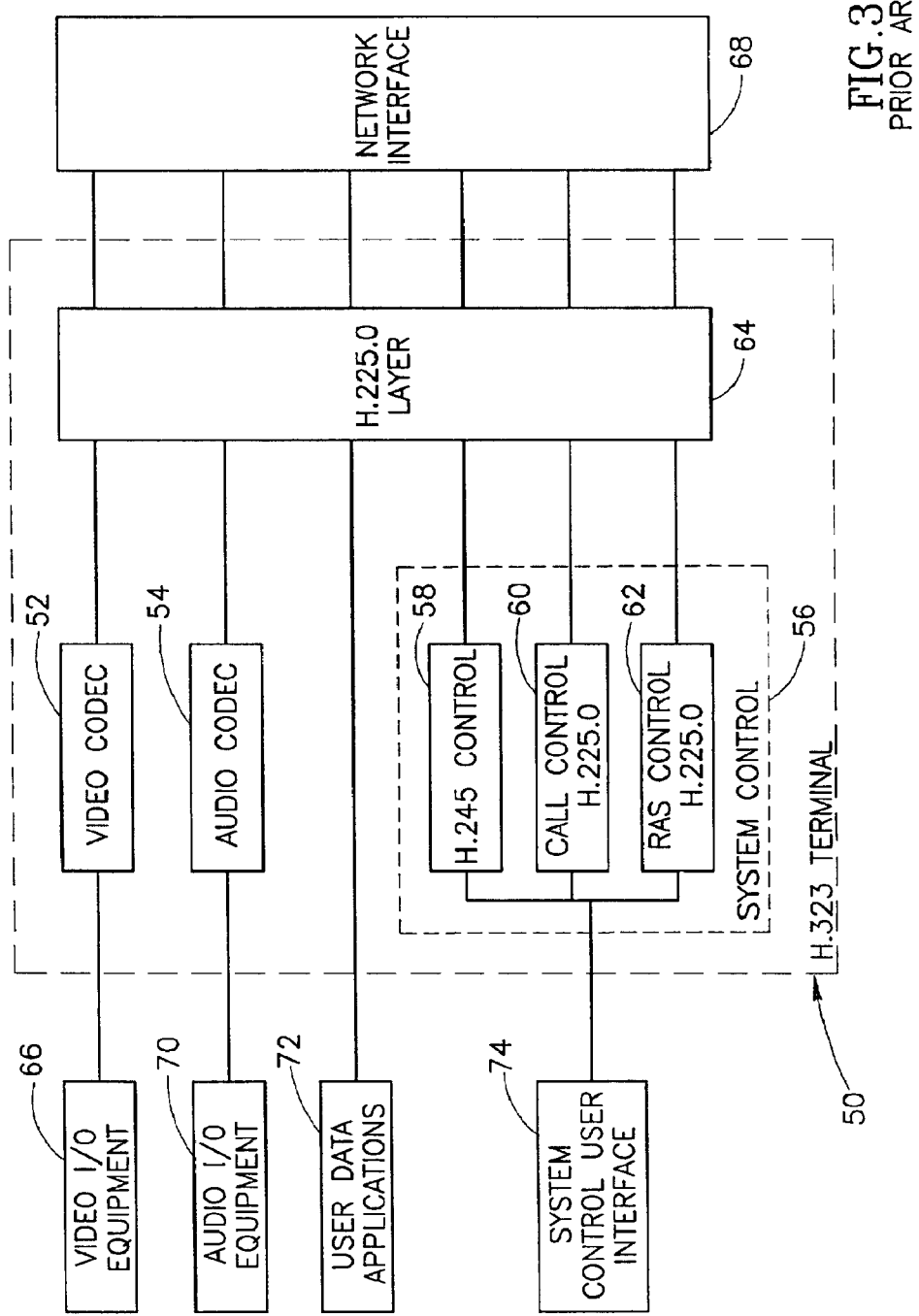
FIG. 3 is a block diagram illustrating an example prior art H.323 compliant terminal equipment wherein each side transmits both transmit and receive audio channel data.

The following notation is used throughout this document.

| Term | Definition |
| --- | --- |
| ACD | Automatic Call Distribution |
| ATM | Asynchronous Transfer Mode |
| CO | Central Office |
| DNS | Domain Name Server |
| DSP | Digital Signal Processing |
| IETF | Internet Engineering Task Force |
| IP | Internet Protocol |
| ISDN | Integrated Services Digital Network |
| ITU | International Telecommunications Union |
| LAN | Local Area Network |
| MAC | Media Access Control |
| MCU | Multipoint Control Network |
| NVRAM | Non Volatile Random Access Memory |
| OC | Optical Carrier |
| PBX | Private Branch Exchange |
| PC | Personal Computer |
| PSTN | Public Switched Telephone Network |
| QoS | Quality of Service |
| RAM | Random Access Memory |
| RAS | Registration, Admission and Status |
| RFC | Request for Comment |
| RSVP | Resource Reservation Protocol |
| RTCP | Real-Time Transport Control Protocol |

-continued

| Term | Definition |
| --- | --- |
| RTP | Real-Time Transport Protocol |
| SCN | Switched Circuit Network |
| SIP | Session Initiation Protocol |
| TCP | Transmission Control Protocol |
| TSAP | Transport layer Access Service Point |
| UDP | User Datagram Protocol |
| USB | Universal Serial Bus |
| WAN | Wide Area Network |

Definitions Used Throughout

The following definitions are used throughout this document.

| Term | Definition |
| --- | --- |
| Call | Point to point multimedia connection between two H.323 endpoints. The call begins with the call setup procedure and ends with the call termination procedure. |
| Call signaling channel | Reliable channel used to convey the call setup and teardown messages between two H.323 entities. |
| Channel | A channel is a uni-directional link between two endpoints. |
| End System | An application that generates the content to be sent in RTP packets and/or consumes the content of received RTP packets. |
| Endpoint | An H.323 terminal, gateway or MCU. An endpoint can call and be called, it generates and/or terminates information streams. |
| Gatekeeper | An H.323 entity on the network that provides address translation and controls access to the network for H.323 terminals, gateways and MCUs. |
| Gateway | An endpoint on the network that provides for real-time, two-way communications between H.323 terminals on the packet based network and other ITU terminals (e.g., ISDN, ATM, etc.) on a switched circuit network. |
| H.323 entity | Any H.323 component including terminals, gateways, gatekeepers, MPs, MCs and MCUs. |
| Port | The abstraction that transport protocols use to distinguish among multiple destinations within a given host computer. RTP depends upon the lower layer protocols to provide some mechanism such as ports to multiplex the RTP and RTCP packets of a session. |
| RTCP Packet | A control packet consisting of a fixed header similar to that of RTP data packets, followed by structured elements that vary depending upon the RTCP packet type. Typically, multiple RTCP packets are sent together as a compound RTCP packet in a single packet of the underlying protocol using the length field in the fixed header of each RTCP packet. |
| RTP Packet | A data packet consisting of the fixed RTP header, a possibly empty list of contributing sources and the payload data. |
| RTP Payload | The data transported by RTP in a packet, for example audio samples or compressed video data. |
| RTP Session | For each participant, the session is defined by a pair of destination Transport Addresses (one Network Address plus a TSAP identifier pair for RTP and RTCP). The destination Transport Address may be common for all participants or may be different for each. In a multimedia session, the media audio and video are carried in separate RTP sessions with their own RTCP packets. The multiple RTP sessions are distinguished by different Transport Addresses. |

-continued

| Term | Definition |
|---|---|
| Switched Circuit Network | A public or private switched telecommunication network such as the PSTN, ISDN, etc. |
| Terminal | An H.323 terminal is an endpoint on the network which provides for real-time, two-way communications with another H.323 terminal, gateway or MCU. |
| Transport Address | The transport layer address of an addressable H.323 entity as defined by the network protocol suite in use. The Transport Address of an H.323 entity is composed of the Network plus the TSAP identifier of the addressable H.323 entity. |
| TSAP Identifier | The piece of information used to multiplex several transport connections of the same type on a single H.323 entity with all transport connections sharing the same Network Address (e.g., the port number in a TCP/UDP/IP environment). TSAP identifiers may be assigned statically by an external authority or assigned dynamically during the setup of a call. |
| Zone | The collection of all terminals, gateways and MCUs managed by a single gatekeeper. A zone includes at least one terminal and may or may not include gateways or MCUs. A zone has one and only one gatekeeper. |

DESCRIPTION OF THE INVENTION

For illustration purposes, the apparatus and method of the present invention are presented in the context of a LAN telephony system operating under the ITU-T H.323 suite of protocols. The H.323 group of protocols is used to transfer multimedia information, e.g., voice, facsimile, video, data, etc., over IP networks. Note, however, that it is intended that the scope of the present invention not be limited to the examples and applications presented herein, as the invention may be applied to numerous other environments, protocols and networks as well.

The present invention provides an apparatus for and a method of simulating the functionality of the gatekeeper in a LAN telephony system. In LAN telephony systems being developed today and most likely in convergent systems developed in the future, the gatekeeper is the central entity. Therefore, the gatekeeper is simulated in order that the behavior of the gatekeeper and all entities attached to it or that communicate with it are fully tested under all possible scenarios. The simulator of the present invention enables tester personnel to have manual control of the behavior of the gatekeeper and its environment.

The gatekeeper simulation platform of the present invention utilizes a commonly available computing platform such as a personal computer (PC) adapted so as to have a LAN connection interface such as a commonly available Network Interface Card (NIC), IP communication stack and an H.323 protocol stack. In addition, the gatekeeper simulation platform comprises a software application that simulates the functionality of the gatekeeper. The gatekeeper simulation software application runs over the IP communication stack and H. 323 protocol stack which together constitute a LAN telephony platform.

Figure 4:
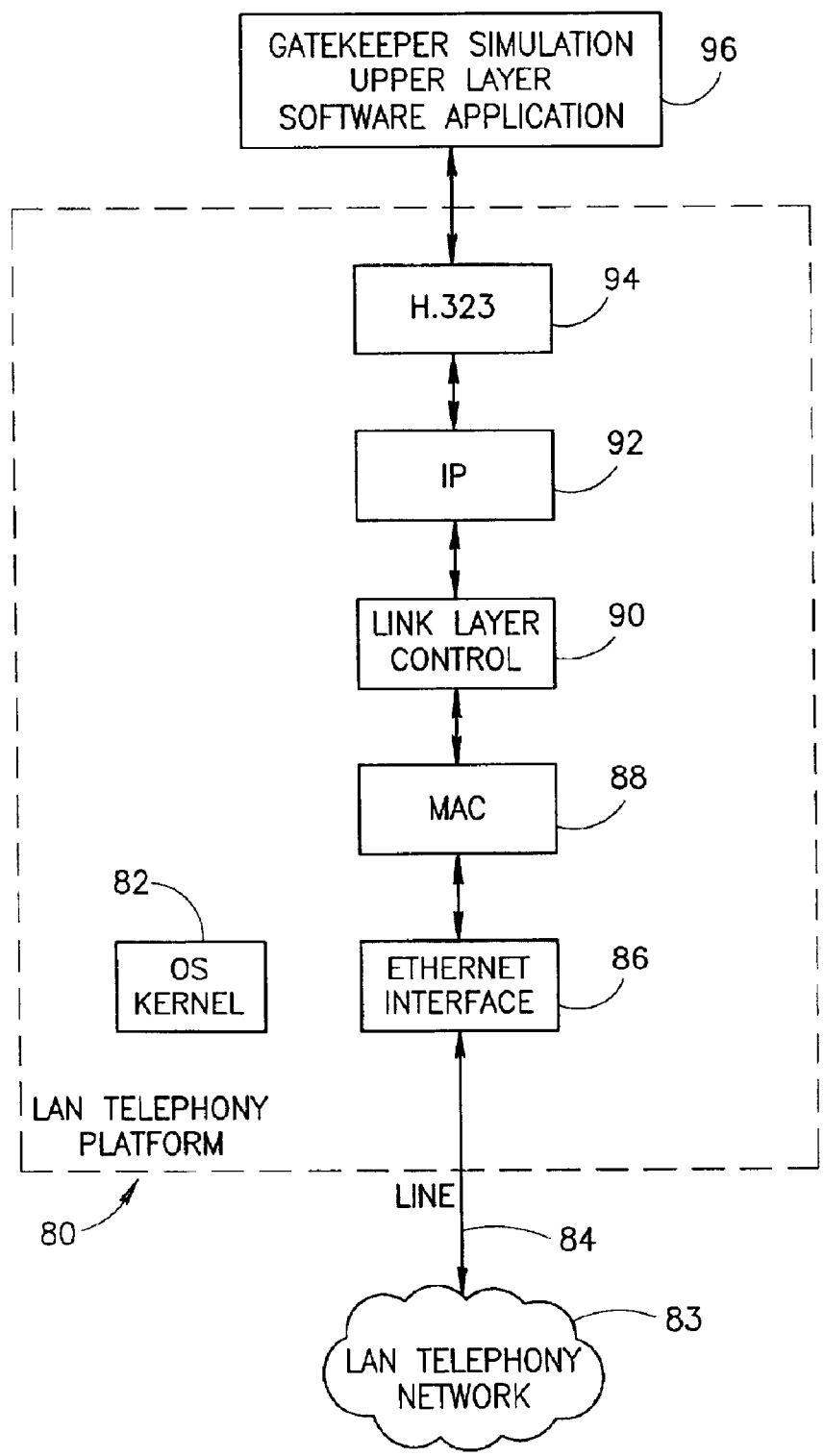
FIG. 4 is a block diagram illustrating the gatekeeper simulator software application running on top of a conventional LAN telephony platform.

A block diagram illustrating the gatekeeper simulator software application running on top of a conventional LAN telephony platform is shown in FIG. 4. The LAN telephony platform, generally referenced 80, comprises an operating system kernel 82 such as Microsoft Windows, Unix, Linux, etc. The platform 80 also comprises a communications stack wherein the lower physical layer consists of any suitable communications medium such as Ethernet, Token Ring, etc. In this example, the LAN telephony platform comprises an Ethernet interface 86 such as a commonly available Ethernet NIC. The Ethernet interface is coupled to the physical line 84 connecting the platform 80 to the LAN telephony network 83.

The Media Access Control (MAC) layer 88 handles the transmit, receive and various control and status signals to and from the Ethernet interface 86. The link layer control layer 90 performs standard functions in Layer 2 of the OSI reference model. The IP layer 92 performs standard functions in Layer 3 of the OSI reference model. The H.323 layer 94 performs the functionality in accordance with the ITU H.323 standard protocol specification. The H.323 protocol layer 94 interfaces with the gatekeeper upper layer software application 96.

Figure 5:
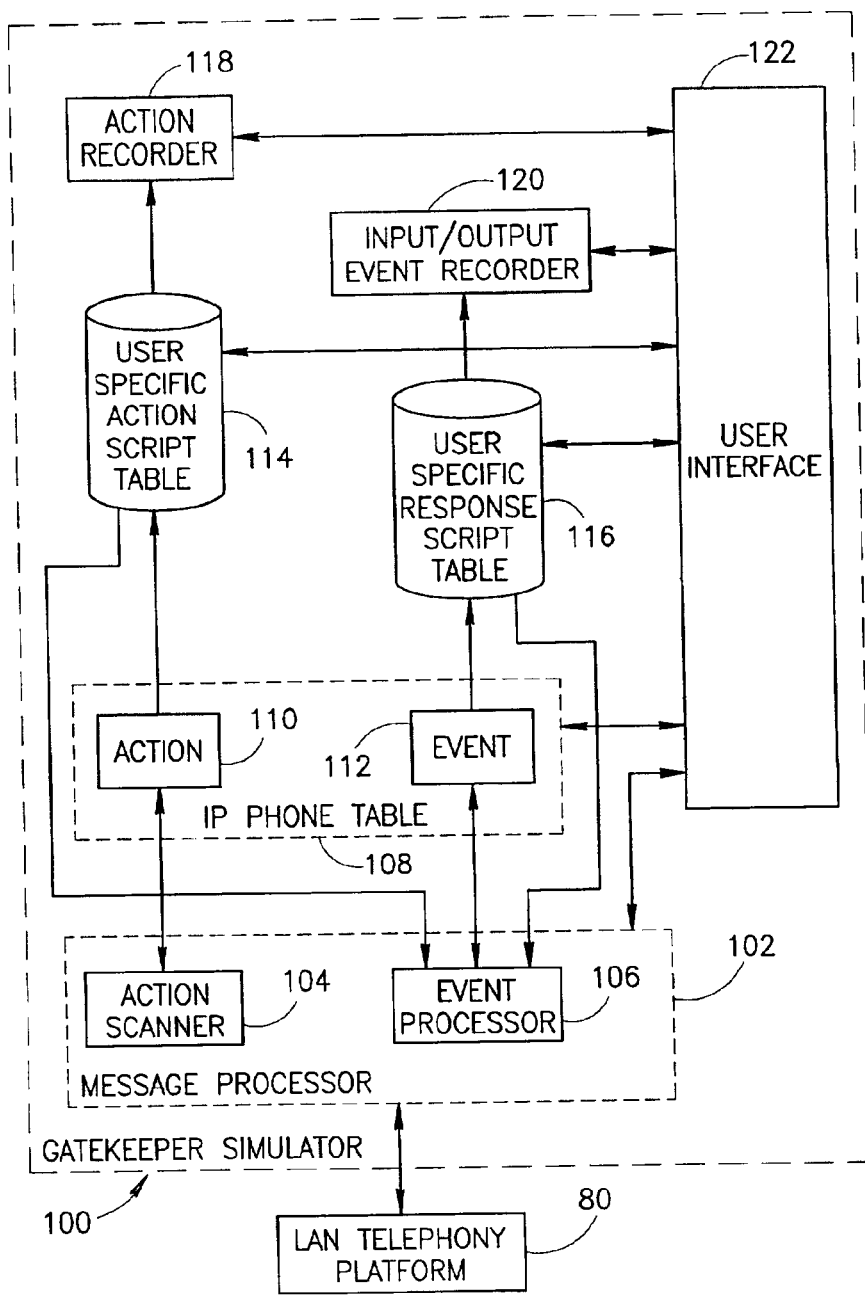
FIG. 5 is a block diagram illustrating the architecture of the gatekeeper simulation software application in more detail.

A block diagram illustrating the architecture of the gatekeeper simulation software application in more detail is shown in FIG. 5. The gatekeeper simulation software application, generally referenced 100, comprises a plurality of functional blocks that when executed in software simulate the functionality of the gatekeeper in a LAN telephony system. The gatekeeper simulator 100 comprises a message processor 102, IP phone table 108, user interface 122, user specific response script table 116, user specific action script table 114, action recorder 118 and input/output event recorder 120.

A major benefit of the gatekeeper simulator is that it is adapted to permit a user to program the environment of the gatekeeper rather than limit the gatekeeper to learning by conventional H.323 protocol mechanisms. This permits a user to simulate any desired environment in a relatively easy manner. The simulator 100 comprises a plurality of tables which can be programmed to simulate the learning or other standard mechanisms normally performed using the H.323 protocol. For example, the simulator is adapted to permit a user to program one of many scenarios in which the gatekeeper is to simulate for a specific device. Each telephone set, for example, can be assigned a separate scenario in which it is to be simulated on the gatekeeper.

In addition, a user can simulate the control path including the ability of simulating numerous fault possibilities permitting the thorough testing of all combinations of failure modes in a system under development.

The functionality of the gatekeeper simulator of the present invention duplicates the functionality of a real gatekeeper. In particular, the gatekeeper simulator is adapted to provide at a minimum the following services:

1. Handling a request to register to and de-register from the gatekeeper.
2. Handling a request to allocate or release bandwidth of a call to other user(s).
3. Handling a request for the IP address of a user given its alias name.
4. Handling a request to establish/release a call to another user(s).
5. Handling a request to open an H.245 channel with another user.
6. Handling a request to open/close an audio channel with another user.
7. Handling a request to open/close a quality report channel with another user.

In addition, the gatekeeper simulator is operative to transfer certain requests from users to a called user. Such request transfers include:

1. Transfer of a request to establish/release a call.
2. Transfer of a request to open an H.245 channel.
3. Transfer of a request to open/close an audio channel
4. Transfer of a request to open/close a quality report channel.

The above transfer requests are example cases wherein control in the LAN telephony system passes through the gatekeeper. Note that the voice path itself does not normally pass through the gatekeeper but is sent directly between the users.

Normally, entities such as IP phones in a LAN telephony system utilize the register/de-register messages to introduce themselves to the gatekeeper. In response to the register command, the gatekeeper builds a table that comprises all the IP phones in the zone handled by that gatekeeper. The data stored in the table includes the names associated with the IP phone, one or more aliases, phone numbers, IP addresses, etc. This IP phone table is used by the gatekeeper to translate between an alias name of a user and its associated IP address. Such a translation is necessary since users do not necessarily have knowledge of IP address of the users they wish to call. They are, however, likely to know their names, aliases, phone numbers, etc. Thus, in order to reach users in an IP network, some entity must perform the translation to an IP address. The translation is performed by the gatekeeper using the IP phone table.

The gatekeeper simulator of the present invention is adapted to simulate numerous scenarios including but not limited to (1) rejecting the registration from a user, (2) accepting the registration from a user, (3) rejecting the de-registration from a user, (4) accepting the de-registration from a user, etc. The rejection may be for any reason supported by the H.323 protocol suite, all of which are supported by the gatekeeper simulator.

The gatekeeper simulator is adapted to simulate any desired request supported by the H.323 protocol suite. In addition, it is adapted to simulate all possible responses to a request as well. Further, it is adapted to simulate the responses selectively and individually for each specific user in the network. In addition, the simulator comprises a pre-programmed address translation table (i.e. IP phone table) that can be configured and programmed by a user to contain the same information it would have contained as a result of IP phones having been registered.

In operation, the message processor 102 functions to process all events that are received from or transmitted to the LAN via the LAN telephony platform 80. The message processor comprises an action scanner 104 and an event processor 106. Both the action scanner and the event processor are configurable via the user interface 122.

The event processor 106 examines the H.323 messages received and extracts the relative information therefrom. In general, the messages processed by the event processor can be classified into two major categories: either events that occur in the LAN telephony network or simulation responses. The events received from the line are in the form of H.323 messages. A simulation response comprises a message generated by the gatekeeper simulator that is transmitted to an entity in the LAN telephony network. The message is generated so that an entity believes it came from the gatekeeper in the system. The content of the message is treated by the entity no differently compared to the case whereby a real gatekeeper is used.

The IP phone table 108 comprises an action database (or table) 110 and an event database (or table) 112. Events that arrive from the line and processed by the event processor 106 are forwarded to the event table 112. When an event is received, the event table 112 in the IP phone table 108 is accessed to determine the appropriate event with which to respond. A look up is performed on the event table using any suitable look up criteria such as source IP address, destination IP address, etc. The table comprises a plurality of records, each record comprising a field for the index such as source IP address and a field comprising a pointer. The event table can, however, be adapted to respond to any suitable criteria that forms part of the internal contents of an H.323 message.

Upon receiving an event, the event table 112 is accessed to obtain an appropriate response to the event. If a hit occurs, i.e. an entry exists for the corresponding look up criteria, the corresponding pointer, also referred to as a response ID, is retrieved from the table and forwarded to the user specific response script table 116.

The response ID retrieved from the event table is used as an index to a particular response script within the user specific response script table 116. The script comprises a simulated response to the event which is configurable by the user via the user interface 122. The response itself can vary depending on the desired response to a particular event. For example, the response may vary in accordance with the characteristics of the event such as event type, whether the IP phone is calling or being called, etc.

After determining the appropriate response, as programmed by the user, the simulated response is forwarded to the event processor 106. The event processor functions to construct a valid H.323 protocol message containing the response and subsequently transmits the message to the LAN via the LAN telephony platform 80.

The user specific response script table 116 comprises a plurality of records wherein each record comprises a plurality of fields. The records include a response ID field, source IP address, destination IP address, input event, call scenario, simulated response, etc. Note that there may be multiple events per IP source address, for example. Each response comprises a single H.323 message that a real gatekeeper might have responded with in reply to an event. Alternatively, a response may comprise an original H.323 message such as a setup message, etc. that is not necessarily in response to an H.323 message generated by another entity.

The input to and the output of the user specific response script table 116 is also forwarded to an input/output event recorder 120. The event recorder 120 is operative to record all events received and all response to events generated along with an associated timestamp. The database of recorded inbound and outbound events are accessible to the user via the user interface for off-line analysis.

The action scanner 104 in the message processor 102 functions to scan the action database 110 in the IP phone table 108. The action database may or may not contain any entries. Each entry represents an action to be simulated corresponding to a particular LAN telephony entity such as an IP phone. The action scanner 104 is adapted to loop through all the entries in the action database causing each action to be performed in serial fashion. Alternatively, multiple actions may be performed in parallel depending on the implementation of the gatekeeper simulator.

The action table is adapted to comprise a plurality of records wherein each record contains at least an index (action ID) and a valid indication. The valid indication is used by the scanner to ignore actions that are in the action database but are not to be performed. Note that for an action to be performed, an entry must be present in the action database 110.

The action scanner can be configured by a user via the user interface 122. The scan rate in which to scan the action entries in the action database is configurable by the user. For example, actions can be performed every 500 ms, 1, 2 or 5 seconds. In addition, scanning can be halted, paused, restarted, reset to the beginning of the action database, etc.

For each action found in the action table, the corresponding action ID (i.e. a pointer) residing in the table is retrieved and passed to the user specific action script table 114. The user specific action script table 114 comprises a plurality of records wherein each record contains at least an action ID index and a particular action. The action is retrieved and forwarded to the event processor 106. When the action is an event message, the message is constructed to contain the appropriate fields, e.g., source and destination IP addresses, etc., and H.323 protocol message content such that the message output will appear as a valid H.323 message to the receiving entity. Note that the message can be generated so that it appears to have been originated from the gatekeeper or any other desired entity in the LAN telephony system.

The specific actions residing in the user specific action script database can be programmed by a user via the user interface 122. A programmed action can be (1) any desired action such as the generation of an event message or can be (2) adapted to trigger a new event. If the action is an event message, the message is retrieved from the action script database and forwarded to the event processor 106 for transmission onto the LAN. The event processor generates a message conforming to H.323 protocol standards and inserts the appropriate values for the fields, i.e. source and destination IP address, etc. in accordance with the desired action.

In case the action is a trigger, the trigger is retrieved from the action script database and forwarded to the event processor 106. The event processor is adapted to generate an event in response to the trigger. The event, in turn, is handled by the event processor as if the event was received in a message from the LAN. Thus, in the case of a trigger, the event is generated internally rather than in response to a message received from the LAN. The event generated in response to the trigger is then processed and if a corresponding entry is found in the event database 112, a response is generated using the response script table 116. This provides the user the ability to setup sophisticated simulation constructs such as loops, chains of messages, etc.

The input to and the output of the user specific action script table 114 is also forwarded to an input/output action recorder 118. The action recorder 118 is operative to record all messages received and all actions transmitted along with an associated timestamp. The database of recorded input messages and actions transmitted are accessible to the user via the user interface for off-line analysis. Optionally, the messages and actions recorded by the action recorder 118 may be synchronized in time with the input/output events and responses recorded by the event recorder 120.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An apparatus for simulating the functionality of a gatekeeper entity in a Local Area Network (LAN) telephony system, comprising:
   a LAN telephony platform adapted to provide lower layer communications including an interface to said LAN telephony network, an IP communications stack and an H.323 protocol stack;
   an event processor adapted to process event messages received from and transmitted to said LAN telephony network;
   an IP phone table comprising an event table portion and an action table portion, said event table adapted to generate a response ID in response to one or more fields in the received event messages;
   a response script table comprising a plurality of responses to events, said response script table operative to generate a response in accordance with said response ID and to forward said response to said event processor for transmission to said LAN telephony network;
   an action scanner adapted to loop through the contents of said action table such that for each valid action within said action table, an action ID is generated;
   an action script table comprising a plurality of actions to be performed, said action script table operative to generate an action in accordance with said action ID and to forward said action to said event processor for subsequent processing; and
   a user interface for permitting a user to preprogram the contents of said event table, said action table, said response script table and said action script table and to configure said action scanner.

2. The apparatus according to claim 1, further comprising an event recorder adapted to record events input to and responses output from said response script table for review by a user at a later time.

3. The apparatus according to claim 1, further comprising an action recorder adapted to record actions generated by said action script table for review by a user at a later time.

4. The apparatus according to claim 1, wherein said response script table comprises a plurality of fields including a response ID, IP source address, IP destination address and input event.

5. The apparatus according to claim 1, wherein said action script table comprises a plurality of fields including an action ID and action.

6. The apparatus according to claim 1, wherein each action comprises an event message.

7. The apparatus according to claim 1, wherein said action comprises a trigger that causes said event processor to generate an event message as if received from said LAN telephony network.

8. The apparatus according to claim 1, wherein said event table comprises a plurality of records, each containing an IP source address, response ID and a valid indicator.

9. The apparatus according to claim 1, wherein said action table comprises a plurality of records, each containing an action ID and a valid indicator.

10. The apparatus according to claim 1, wherein said LAN telephony platform comprises an Ethernet interface, Media Access Control (MAC) layer, link layer control, IP stack and H.323 protocol stack.

11. A method for simulating a gatekeeper in a Local Area Network (LAN) telephony network, said method comprising the steps of:
   providing a LAN telephony platform adapted to provide lower layer communications including an interface to said LAN telephony network, an IP communications stack and an H.323 protocol stack;
   processing event messages received from and transmitted to said LAN telephony network including looking up a response ID corresponding thereto utilizing an event table; and upon occurrence of a hit, retrieving a specific response from a response script table, using the corresponding response ID, and subsequently transmitting said response onto said LAN network;

cycling through a plurality of action ID pointers stored in an action table, each action pointer associated with an action to be performed; and retrieving a specific action from an action script table, using the corresponding action pointer, and performing each action corresponding therewith.

12. The method according to claim 11, further comprising the step of providing a user interface for permitting a user to preprogram the contents of said event table, said action table, said response script table and said action script table.

13. The method according to claim 11, further comprising the step of recording events input to and responses output from said response script table for review by a user at a later time.

14. The method according to claim 11, further comprising the step of recording actions generated by said action script table for review by a user at a later time.

15. The method according to claim 11, wherein said response script table comprises a plurality of fields including a response ID, IP source address, IP destination address and input event.

16. The method according to claim 11, wherein said action script table comprises a plurality of fields including an action ID and action.

17. The method according to claim 11, wherein each action comprises an event message.

18. The method according to claim 11, further comprising the step of generating an event message as if received from said LAN telephony network when said action comprises a trigger.

19. The method according to claim 11, wherein said event table comprises a plurality of records, each containing an IP source address, response ID and a valid indicator.

20. The method according to claim 11, wherein said action table comprises a plurality of records, each containing an action ID and a valid indicator.

21. The method according to claim 11, wherein said LAN telephony platform comprises an Ethernet interface, Media Access Control (MAC) layer, link layer control, IP stack and H.323 protocol stack.

* * * * *